Figure 1:
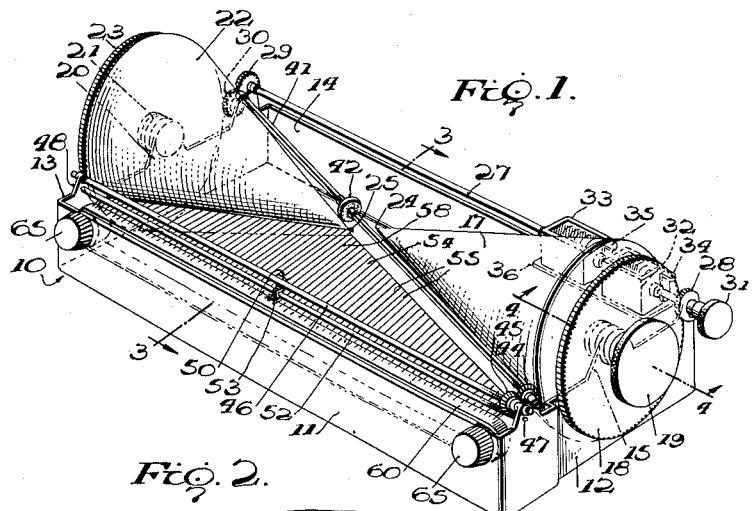

April 11, 1961 W. W. CUSHMAN 2,979,256
CARGO BALANCE COMPUTER FOR AIRCRAFT
Filed July 2, 1958 2 Sheets-Sheet 1

INVENTOR
Walton W. Cushman

BY
*H. J. Eccleston,*
ATTORNEY

April 11, 1961 W. W. CUSHMAN 2,979,256
CARGO BALANCE COMPUTER FOR AIRCRAFT
Filed July 2, 1958 2 Sheets-Sheet 2
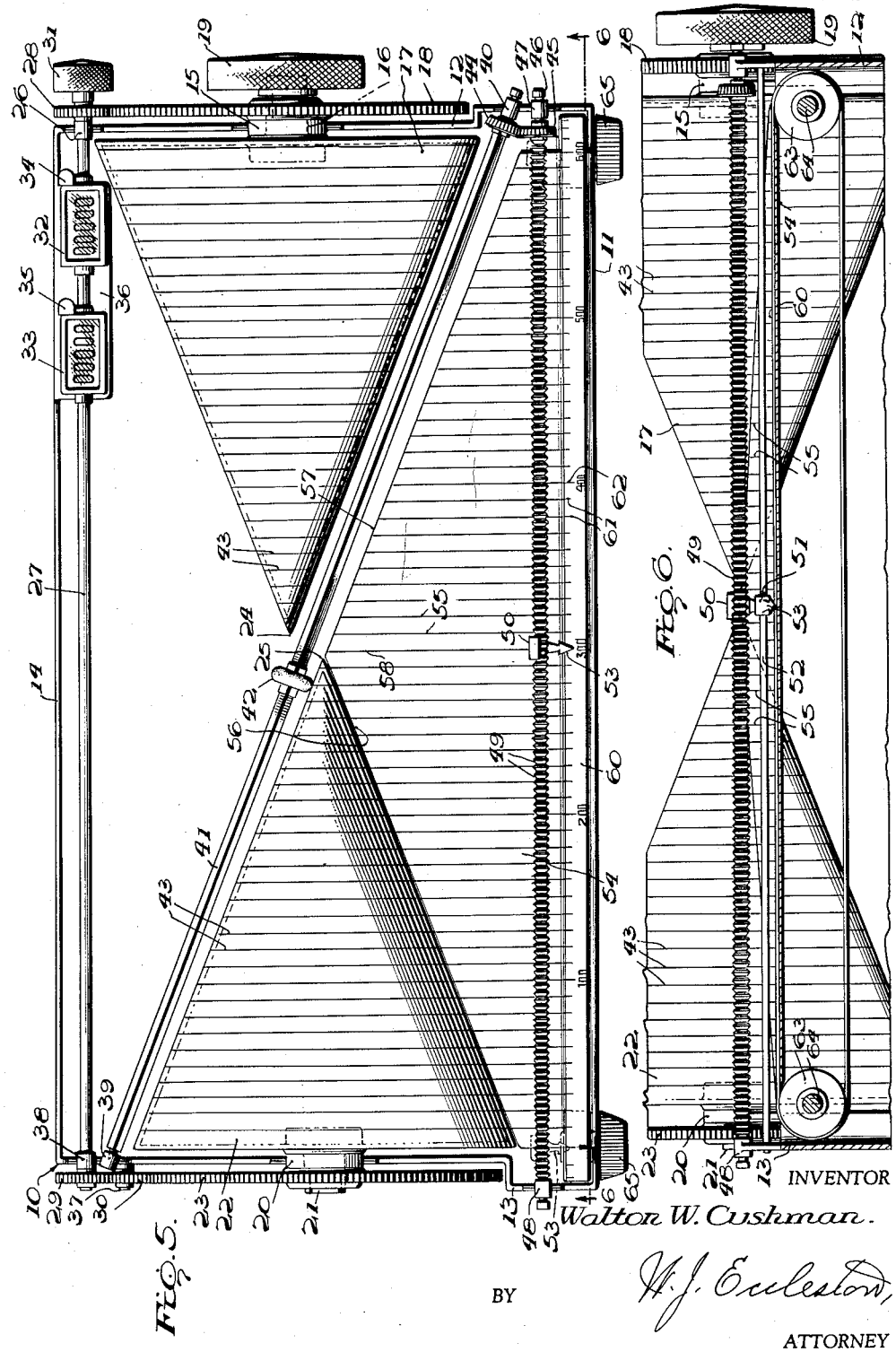
INVENTOR
Walter W. Cushman
BY
H. J. Eccleston,
ATTORNEY United States Patent Office 2,979,256
Patented Apr. 11, 1961

2,979,256
CARGO BALANCE COMPUTER FOR AIRCRAFT
Walton W. Cushman, 6428 Lumar Drive SE., Washington, D.C.
Filed July 2, 1958, Ser. No. 746,305
5 Claims. (Cl. 235—61)
(Granted under Title 35, U.S. Code (1952), sec. 266)

The invention described herein, if patented, may be manufactured and used by or for the Government for governmental purposes, without the payment to me of any royalty thereon.

The invention relates to means for computing the distribution of cargo items in the cargo compartment of an aircraft, particularly an aeroplane, so that the total weight of the cargo items is desirably distributed on opposite sides of the center of gravity of the craft. Such devices are known and usually comprise some form of scale balance together with a plurality of graduated weights to simulate cargo items to which their weight are proportioned.

These devices have the disadvantage that they require great care in being set up to insure that the scale is level; require a large number of scale weights which are readily lost; and are operable for but a single type of model of aircraft whereby to require a different device for each model of cargo craft.

With the foregoing in view, it is an object of the invention to provide an improved cargo balance computer which eliminates the use of a scale balance and the necessary graduated weights.

A further object is to provide an improved cargo weight and balance computer for an aircraft which utilizes a fixed scale bearing spaced indicia each designating a cargo station in the cargo compartment of an aircraft, there being a centrally disposed fixed reference point which designates the center of gravity of the aeroplane. There is included also a movable indicator movable linearly along said scale in opposite directions distances commensurate with the weight of each cargo item in question and the cargo station involved, the position of said indicator relative to said fixed reference point indicating the balance or imbalance of said aircraft after each simulated loading of a cargo item.

A further object is to provide in such a computer, means for moving said fixed scale laterally in both directions relative to said fixed reference point whereby to locate any selected indicia of said scale opposite said reference joint so as to adapt the computer for use in calculating the loading of any of a wide variety of aircraft.

A further object is to provide in a device such as that last described, a register for designating the total weight loaded after each simulated loading.

A further object is to provide in such a computer a single driving means for simultaneously moving said movable indicator and operating said register.

Other objects and advantages reside in the particular structure of the invention, the structure of the several elements of the same, combinations and subcombinations of such elements, and/or in the particular method or mode of operation, all of which will be readily apparent to those skilled in the art upon reference to the attached drawing which illustrates one species of the invention and to the following specification wherein the invention is described and claimed.

Figure 2:
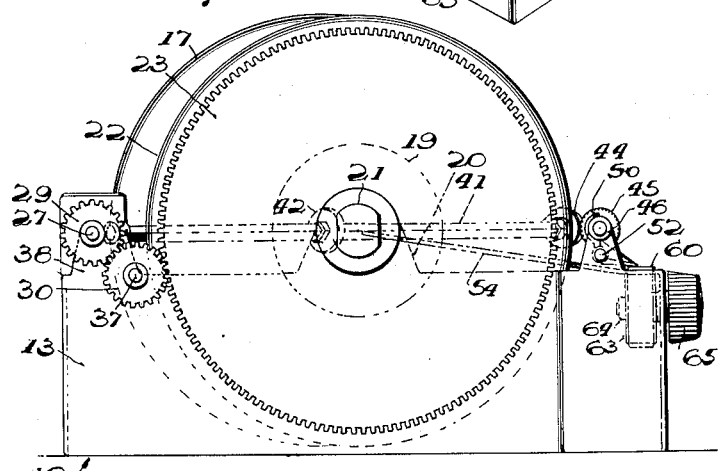
Figure 4:
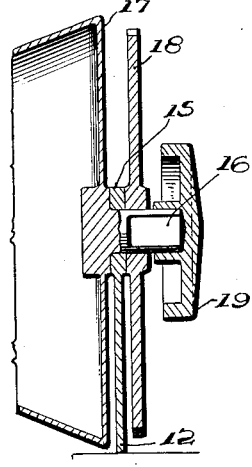
Figure 3:
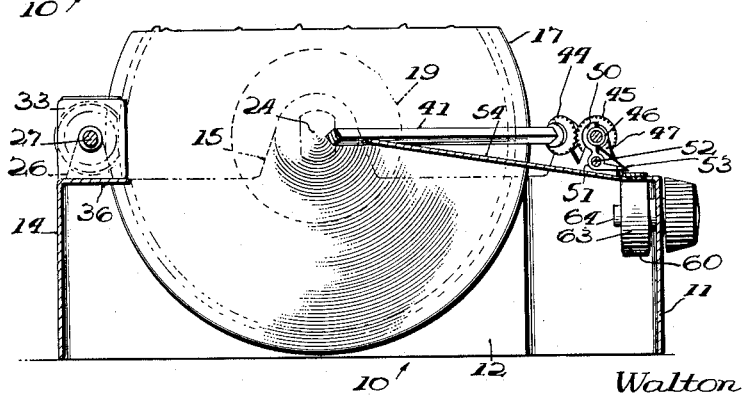

In the drawing:
Figure 1 is a perspective view looking from above of a weight and balance computer according to the invention;
Figure 2 is an enlarged end elevation thereof looking from the left of Figure 1;
Figure 3 is a vertical sectional view on the scale of Figure 2 but substantially on the plane of the line 3—3 of Figure 1, parts being broken away;
Figure 4 is a fragmentary, longitudinal vertical sectional view on the scale of Figure 2 but taken substantially on the plane of the line 4—4 of Figure 1;
Figure 5 is a plan view of the invention on the scale of Figure 2; and
Figure 6 is a longitudinal vertical sectional view taken substantially on the plane of the line 6—6 of Figure 5, parts being broken away.

Referring specifically to the drawing wherein like reference characters designate like parts in all views, 10 designates generally any suitable base which may be rectangular in shape so as to provide a front wall 11, right and left hand end walls 12, 13, and a rear wall 14. The right hand end wall 12 has a thickened ear 15 extending upwardly thereof which is centrally apertured to provide a bearing or journal for a stub shaft 16 which extends axially outwardly of the base of a rotor 17 which is in the form of a cone. The stub shaft 16 extends outwardly through the journal 15 and has keyed thereon a spur gear 18. Any suitable actuating means for rotating the shaft 16 such as the knob 19 is keyed thereon outwardly of the gear 18.

The left hand end wall 13 likewise has a thickened ear 20 extending above its upper edge and which is apertured to provide a journal for a second stub shaft 21 which extends axially outwardly of the base of a second rotor 22 which is in the form of a cone which is substantially identical to the cone 17. A spur gear 23 identical to the spur gear 18 is keyed to the stub shaft 21 outwardly of the journal 20. As best seen in Figures 5 and 6, the stub shafts 16 and 21 are coplanar and parallel but are laterally offset slightly so that the apices 24 and 25 of the cones 17 and 22 together with their axes are likewise laterally offset. Thus, the cones have spaced and opposed parallel peripheries. Also, it will be noted that such apices 24 and 25 are slightly axially spaced for a purpose which will be apparent hereinafter.

To drive the second rotor 22 means now to be described have been provided. The end walls 12 and 13 have aligned journals providing ears 26 and 38 mounted on the upper edges thereof in the region of the rear wall 14. Such journals 26 and 38 have mounted therein a shaft 27 which in turn has identical right and left pinion gears 28 and 29 keyed on the opposite ends thereof. The right hand pinion 28 is meshed with the spur gear 18. The left hand pinion 29 is meshed with an identical pinion 30 Figure 2, which is keyed on a stub shaft 37 journalled in the left hand ear 38. Such pinion 30 is meshed with the left hand spur gear 23. Thus, as the rotor 17 is rotated in one direction by the knob 19, it drives the rotor 22 in the opposite direction and at the same speed in a manner readily understood. If desired, the right hand end of the shaft 27 may have keyed thereon any suitable actuating means such as the knob 31. Also, it is preferred that the shaft 27 have mounted thereon for operation thereby rotation registers 32 and 33. These are conventional and have the conventional reset levers 34, 35 whereby one or both may be reset to zero or to any other desired recording. By providing two registers 32, 33, one may be used to count total rotations of a series of groups of rotations while the other may be reset after each group of rotations whereby the rotations of each group may be separately noted. The registers 32, 33 may be mounted in any suitable manner as on a ledge 36 which may be an inwardly directed extension of the rear wall 14.

It is understood that each register registers a preselected unit of weight for each rotation of the shaft 27 so that the operator discontinues the rotation of such shaft when the weight of the cargo item in question is registered. The purpose of this arrangement will be apparent hereinafter.

The left hand journal-providing ear 38 has formed thereon a third journal 39 in which is journalled the left hand cylindrical end of a noncircular shaft means 41, the other cylindrical end of which is journaled in a diagonally opposite journal 40 on the right hand end wall 12 in the region of the front wall 11. A driven rotary member 42 comprising a friction wheel is manually slidably mounted on the non-circular shaft 41. Shaft 41 extends between the cones 17 and 22 in equidistant and parallel relation to the opposed parallel peripheries thereof. Thus, the friction wheel 42 is in frictional engagement with the periphery of one cone or the other at all times. It should be noted that each of the cones 17 and 22 have formed thereon suitable parallel and circumferential lines 43 each of which designates a cargo loading or inch station in a cargo aeroplane. At this time it is sufficient to say that by manually sliding the driven member 42 along the shaft 41, the former may be positioned at any simulated loading station 43 of either cone but will be rotated in one direction by one cone and in the opposite direction by the other.

The right hand end of the non-circular shaft 41 has keyed thereon a bevel gear 44 which in mesh with a bevel gear 45 of like ratio which is keyed on a shaft 46 one end of which is journaled in a bearing 47 on the right hand end wall 12 and the other end of which is rotatably mounted in a journal 48 on the left hand wall 13. Intermediate the end walls 12 and 13, the shaft 46 is formed with screw threads 49 which threadedly engage a half-nut or traveler 50 now to be described.

The half nut 50 includes a subjacent journal portion 51, Figure 6, which is pivotally and slidably mounted on a counter shaft 52 the opposite ends of which are secured in the end walls 12 and 13. Such half nut 50 also includes an indicator pointer or finger 53 which projects forwardly from beneath the threaded shaft portion 49 of the shaft 46. Such indicator finger overlies a fixed scale 54 which may comprise a substantially triangular shelf which projects inwardly of the front wall 1 toward the cones 17 and 22 and which may have converging front edges 56 and 57 which are respectively disposed adjacent and parallel to the peripheries of the cones 22 and 17. The upper surface of the scale 54 is provided with suitable indicia such as the parallel lines 55 which are aligned with the like lines 43 on the cones 17 and 22 and which likewise designate cargo loading stations on a cargo aeroplane. It should be understood at this time that the half nut or indicator 50 may be located at any selected cargo loading station by elevating the finger 53 so as to disengage the half nut 50 from the threads 49 and thereafter sliding the journal portion 51 along the counter shaft 52. The half nut 50 is loaded into engagement with the shaft 46 by any suitable spring or counterbalance means, not shown. Also, it is understood, that with the half nut 50 engaged with the threads 49, it will travel along the shafts 46 and 52 in either direction as the non-circular shaft is rotated by the cones through the driven member 42.

The effect of this arrangement is to cause the indicator 50 to travel a distance commensurate with the weight of cargo item the loading of which is being simulated. That is, it will travel a greater distance for a 1000 pound load than it will for a 500 pound item. Also, the distance traveled with vary with the cargo station selected. Thus, because cones instead of cylinders have been used, the driven member 42 will rotate several times for each rotation of the cone when the driven member is located at an inch station near the base of a cone. In like manner, it will have less than a complete rotation for each rotation of the cone when the driven member 42 engages a point on a cone having a lesser diameter than that of the driven member. Thus, the travel of the traveler 50 will vary from a maximum for a cargo item loaded near the forward or rear ends of the cargo compartment to a minimum when a like cargo item is loaded at a station near the center of gravity. The purpose of this arrangement is to introduce a moment factor comparable to that which exists for each individual aircraft cargo item.

As so far described, the invention is operative for a single type of cargo aeroplane and for a fixed center of gravity or center of lift. However, to increase the flexibility of the invention and to enable it to be used with all known types of cargo aeroplanes and with a variety of centers of lifts, the feature now to be described has been devised.

In the embodiment illustrated, there has been provided a second scale 60 which comprises an endless band having spaced indicia 61 on the outer surface. Each indicia 61 represents an inch station in the cargo compartment of any cargo aeroplane and the total number of inch stations is sufficient to cover the cargo compartment of any known cargo aeroplane. For convenience, as best seen in Figure 5, each indicia may designate an inch station ten inches apart with each tenth station labeled with the appropriate one hundred inch station indicia 62. The scale-band 60 is mounted with its horizontal upper run just forwardly of the fixed scale 54 and substantially coplanar therewith. The pointer 53 of the traveler or indicator 50 is disposed to overlie the upper run. The mounting means for the scale 60 may comprise any suitable means such as the drums 63 which are mounted on parallel stub shafts 64 which are journalled in the front wall 11 adjacent the end walls 12 and 13. The stub shafts may have actuating knobs 65 keyed thereon for rotating the same to drive the endless scale 60 in either direction whereby any selected inch station 61 may be aligned with the fixed center of gravity indicia 58, or reference point, of the fixed scale 54. Any suitable friction type brake or like means, not shown, may be provided to retard movement of the drums and prevent accidental movement of the band 60 after it has been moved to a selected setting.

It is apparent from the foregoing, that if an aeroplane having its normal center of gravity at the 200 inch station is to be loaded, the band 60 is moved until that station is aligned with the fixed reference point 58 of the fixed scale 54. Thereafter, if the center of gravity of the next craft to be loaded is disposed at the 300 inch station, the band is moved to align that station with the fixed reference point 58. Also, if the type or amount of the load to be loaded is such that it is desired to locate the center of lift of the craft elsewhere than on the normal center of gravity of the aeroplane, the indicia designating the desired center of lift may be moved opposite the fixed reference point 58. In each event, the simulated loading proceeds as described hereinafter.

Assuming the aeroplane to be loaded has its normal center of gravity at the 300 inch station and the desired center of lift is likewise located at that station, then that indicia on the scale 60 is aligned with the fixed reference point 58 and the pointer 53 of the traveler or indicator 50 is likewise aligned with the reference point 58, see Figure 5. The driven rotary member 42 is now manually slid along its shaft 41 until it registers with the inch station at which it is desired to load the first cargo item, in this case the 280 inch station which is located on the rotor 22. Both registers 32 and 33 are set at zero and the knob 31 is turned until the weight of the cargo item in question is recorded. Meanwhile, the traveler or indicator 50 has traveled along its shaft 46 away from the fixed reference point 58 a distance commensurate with the weight of the cargo item in question and the inch station selected. The operator now makes a written note of the weight of the cargo item and the loading station at which its loading was simulated. One of the registers 32 or 33 is now reset to zero leaving the other to record the total weight of the cargo. The driven rotary member 42 is now manually set at a second inch station, one which is on the other rotor 17. The knob 31 is again turned in the same direction until the weight of the second cargo item is registered on the register, say 32, which was reset to zero. Meanwhile, the indicator 50 has traveled in the opposite direction along its shaft 46 a distance commensurate with the weight of the second cargo item and the inch station selected. If the second cargo item was of the same weight as the first and loading was simulated at the 320 inch station, the pointer 50 will have returned to the 300 inch station indicia and the fixed reference point 58. The operator notes the weight and loading station of the second cargo item and continues with the simulated loading. Successive cargo items are alternately loaded at loading stations on opposite sides of the fixed reference point 58 to insure that the indicator does not reach either end of its shaft 46 which might be the case if too many cargo items were successively loaded at one side of center of gravity. Also, by alternating the loading with each item, the operator knows at all times how close the loading is to being balanced or within the allowable limits of imbalance and can make corrections as the simulated loading progresses. When loading of the final cargo item has been simulated by rotating the shaft 27 enough times to register the known total weight of all of the cargo items, the location of the indicator 50 and its pointer 53 shows the balance or imbalance of the aeroplane in question if so loaded. In all cargo aeroplanes, there is a permissible range on either side of the center of gravity or center of lift. This range may be relatively wide with light loads and correspondingly narrow with heavy loads. In the example described above it is assumed that the range for the simulated loading in question is between the 290 and 310 inch stations. Thus, if the pointer 53 lies between these stations when the simulated loading of the last cargo item has been completed, then the operator knows that the plane will be properly balanced if so loaded and he directs that the plane be so loaded in accordance with the loading chart which he has made up as loading of the individual items was simulated. On the other hand, if the pointer 53 lies out-side of the permissible range, it may be possible to correct it by reverse rotation of the shaft 27 until the last item loaded is eliminated from the total register 33. The driven rotary member 42 is now set at different inch stations in a direction calculated to correct the imbalance. Loading of the last item at its new station is now simulated to see if this slight rearrangement will suffice to correct the imbalance or at least bring it within the prescribed limits. If it does, the loading chart is complete. If not, it may be necessary to go back through two or more of the last loaded items or even to start all over again. In the hands of a skilled aeroplane loader or maker of cargo charts, few changes should be necessary after the initial simulated loading. However, even if loading needs to be simulated several times, use of the aforesaid described invention is far superior to actually loading and reloading the aeroplane until a properly balanced loading has been achieved.

While there has been shown and described what is now thought to be a preferred embodiment of the invention, it is understood that the same is susceptible of other forms and expressions. Consequently, the invention is not considered as being limited to the precise structures shown and described hereinabove but only as hereinafter claimed.

I claim:

1. A weight and balance computer for an aeroplane, comprising a support, a pair of substantially identical cones, means mounting said cones on said support for rotation relative thereto, said cones being disposed on said support in opposed and laterally offset relation with parallel axes and adjacent apices, said cones having spaced and opposed parallel peripheries, said cones being formed with spaced inch station designating indicia, said indicia of one cone designating cargo stations on one side of the center of gravity of an aeroplane and said indicia of the other cone designating cargo stations on the other side of said center of gravity, means for rotating said cones in opposite directions, at least one register for registering the weight of each cargo item upon rotation of said cones, each rotation or partial rotation of said cones registering a predetermined weight unit on said register, a friction wheel, shaft means mounting said friction wheel, said shaft means being disposed between said parallel peripheries of said cones in equidistant parallel relation thereto, said friction wheel being manually slidable along said shaft means to any selected indicia of both cones, said friction wheel being in frictional engagement with one cone or the other at all times whereby said shaft means and friction wheel are rotated with said cones, a scale carried by said support in laterally offset parallel relation to said cones, said scale being formed with spaced inch station designating indicia in alignment with said indicia on said cones, there being a fixed aeroplane center of gravity designating indicia on said support centrally thereof, a threaded shaft rotatably mounted on said support in offset parallel relation to said scale, a nut threadedly engaging said threaded shaft, means preventing rotation of said nut with said threaded shaft whereby to cause said nut to travel along said threaded shaft as the latter is rotated, means connecting said threaded shaft to said shaft means for rotation therewith as the latter is rotated by said cones, said friction wheel being alternately located at an inch station on one cone and then at an inch station on the other cone, said cones being rotated after each location of said friction wheel sufficiently to register the weight of a selected cargo item on said register whereby to cause said nut to travel successively in opposite directions from said center of gravity indicia, and the balance or imbalance of said loaded aeroplane being indicated by the position of said nut relative to said center of gravity indicia after the weight of the last cargo item has been registered.

2. A weight and balance computer for an aeroplane, comprising a support, a pair of substantially identical cones, means mounting said cones on said support for rotation relative thereto, said cones being disposed on said support in opposed and laterally offset relation with parallel axes and adjacent apices, said cones having spaced and opposed parallel peripheries, said cones being formed with spaced inch station designating indicia, said indicia of one cone designating cargo stations on one side of the center of gravity of an aeroplane and said indicia of the other cone designating cargo stations on the other side of said center of gravity, means for rotating said cones in opposite directions, at least one register for registering the weight of each cargo item upon rotation of said cones, each rotation or partial rotation of said cones registering a predetermined weight unit on said register, a friction wheel, shaft means mounting said friction wheel, said friction wheel being manually slidable along said shaft means to any selected indicia of both cones, said shaft means being disposed between said parallel peripheries of said cones in equidistant parallel relation thereto, said friction wheel being in frictional engagement with one cone or the other at all times whereby said shaft means and friction wheel are rotated with said cones, a scale carried by said support in laterally offset parallel relation to said cones, said scale being formed with spaced inch station designating indicia in alignment with said indicia on said cones, there being a fixed aeroplane center of gravity designating indicia on said support centrally thereof, a traveling indicator, means mounting said indicator in adjacent relation to said scale, driving means for moving said indicator along said scale in opposite directions from a starting position opposite said center of gravity indicia, and means operatively connecting said driving means to said shaft means so as to move said indicator along said scale as said cones are rotated.

3. A weight and balance computer for an aeroplane, comprising a support, a pair of substantially identical rotors, means mounting said rotors on said support for rotation relative thereto, said rotors having adjacent ends, said rotors being disposed in laterally offset end-end relation with their axes parallel, said rotors having spaced and opposed parallel peripheries, said rotors being formed with longitudinally spaced indicia designating inch stations in an aeroplane, said indicia of said rotors designating inch stations on opposite sides of the center of gravity of an aeroplane, means for simultaneously rotating said rotors in opposite directions, at least one register for registering the weight of each cargo item, each rotation of said rotors registering a predetermined weight unit on said register, a shaft means between said rotors in equidistant parallel relation to said parallel peripheries thereof, a friction wheel slidably mounted on said shaft means for positioning therealong opposite selected inch stations of said rotors, said friction wheel being in frictional engagement with one rotor or the other at all times whereby to rotate said friction wheel and said shaft means with said rotors, a scale on said support in laterally offset parallel relation to said rotors, said scale being provided with spaced inch station designating indicia in alignment with said indicia on said rotors, one of said indicia on said scale being located on a plane passing between said adjacent ends of said rotors and being a fixed aeroplane center of gravity designating indicia, a threaded shaft rotatably mounted on said support in offset parallel relation to said scale, an indicator threadedly engaged with said shaft for movement therealong upon rotation of said shaft, means connecting said shaft to said shaft means for rotation therewith, said friction wheel being located selectively at inch stations on both rotors, said rotors being rotated sufficiently with the friction wheel at each selected inch station to register the weight of a cargo item to be disposed at such inch station, said indicator traveling back and forth on said shaft as the same is rotated in opposite directions, and the balance or imbalance of said loaded aeroplane being indicated by the position of said indicator relative to said center of gravity indicia on said scale after the weight of each cargo item has been registered.

4. A weight and balance computer for an aeroplane, comprising a scale provided with a plurality of spaced indicia each designating an inch station in the cargo compartment of an aeroplane, means providing a fixed reference point adjacent said scale and designating the center of gravity of an aeroplane, means mounting said scale for lateral movement to the right and left of said reference point whereby to locate any selected indicia opposite said reference point, an indicator, means mounting said indicator for linear movement in both directions along said scale, rotary means for moving said indicator linearly in one direction from a starting point opposite said reference point a distance commensurate with the weight of a first cargo item to be loaded at a selected inch station, said indicator thereafter being moved alternately in opposite directions by said rotary means distances commensurate with the weights of successive cargo items to be loaded on said aeroplane at selected inch stations, the position of said indicator relative to said reference point after the final movement of said indicator providing a visual indication of the balance or imbalance of said aeroplane if so loaded, said rotary means comprising a pair of conical rotors, means mounting said rotors in coplanar and parallel laterally offset end-to-end relation, said rotors having spaced and opposed parallel peripheries, there being one rotor to the left of said reference point and one rotor to the right of the same, means for simultaneously rotating said rotors in opposite directions, said rotors being in spaced and parallel relation to said scale, said rotors bearing inch station indicia corresponding to that of said scale and alignable therewith, a friction wheel, means mounting said friction wheel for linear movement along said rotors along a line parallel to said opposed peripheries of the same, said friction wheel being rotated in one direction by one rotor and in the opposite direction by the other rotor, and means operatively connecting said friction wheel to said means mounting said indicator to actuate the latter as said friction wheel is rotated.

5. A weight and balance computer for an aeroplane, comprising a support, a pair of substantially identical cones, means mounting said cones on said support for rotation relative thereto, said cones being disposed on said support in opposed and laterally offset relation with parallel axes and adjacent apices, said cones having spaced and opposed parallel peripheries, said cones being formed with spaced inch station designating indicia, said indicia of one cone designating cargo stations on one side of the center of gravity of an aeroplane and said indicia of the other cone designating cargo stations on the other side of said center of gravity, means for rotating said cones in opposite directions, a friction wheel, shaft means mounting said friction wheel, said shaft means being disposed between said parallel peripheries of said cones in equidistant parallel relation thereto, said friction wheel being slidable along said shaft means to any selected indicia of both cones, said friction wheel being in frictional engagement with one cone or the other at all times whereby said shaft means and friction wheel are rotated with said cones, a scale carried by said support in laterally offset parallel relation to said cones, said scale being formed with spaced inch station designating indicia in alignment with said indicia on said cones, there being a fixed aeroplane center of gravity designating indicia on said support centrally thereof, a traveling indicator, means mounting said indicator in adjacent relation to said scale, driving means for moving said indicator along said scale in opposite directions from a starting position opposite said center of gravity indica, and means operatively connecting said driving means to said shaft means so as to move said indicator along said scale as said cones are rotated.

References Cited in the file of this patent
UNITED STATES PATENTS

| | | |
|---|---|---|
| 2,025,606 | Nichols | Dec. 24, 1935 |
| 2,599,055 | Heckard et al. | June 3, 1952 |